(12) United States Patent
Hustache et al.

(10) Patent No.: US 8,308,912 B2
(45) Date of Patent: Nov. 13, 2012

(54) METHOD FOR PYROGASIFICATION OF ORGANIC WASTE

(75) Inventors: Francois Hustache, Andresy (FR); Alain Chantelat, Draveil (FR)

(73) Assignees: Francois Hustache, Andresy (FR); Alain Chantelat, Draveil (FR); Jacques Point, Carouge Geneve (CH)

( * ) Notice: Subject to any disclaimer, the term of this patent is extended or adjusted under 35 U.S.C. 154(b) by 0 days.

(21) Appl. No.: 13/322,348

(22) PCT Filed: May 25, 2010

(86) PCT No.: PCT/FR2010/000388
§ 371 (c)(1),
(2), (4) Date: Dec. 21, 2011

(87) PCT Pub. No.: WO2010/136669
PCT Pub. Date: Dec. 2, 2010

(65) Prior Publication Data
US 2012/0097517 A1    Apr. 26, 2012

(30) Foreign Application Priority Data
May 25, 2009    (FR) ..................... 09 02500

(51) Int. Cl.
*C10B 49/16*    (2006.01)
(52) U.S. Cl. ................ 201/12; 201/3; 202/99; 208/411; 432/27; 432/215
(58) Field of Classification Search ............... 201/3, 12; 202/99; 208/411, 126; 432/27, 215
See application file for complete search history.

(56) References Cited

U.S. PATENT DOCUMENTS

| | | | |
|---|---|---|---|
| 1,712,082 A | 5/1929 | Koppers | |
| 2,494,695 A | 1/1950 | Fisher | |
| 3,034,979 A | 5/1962 | Nevens | |
| 4,038,100 A * | 7/1977 | Haberman | .................... 106/472 |
| 4,260,456 A * | 4/1981 | Schulman | ........................ 201/12 |
| 4,421,629 A | 12/1983 | York et al. | |
| 2009/0218209 A1 | 9/2009 | Poulleau et al. | |

FOREIGN PATENT DOCUMENTS

| | | |
|---|---|---|
| FR | 2 858 570 A1 | 2/2005 |
| WO | WO 2005/018841 | 3/2005 |
| WO | WO 2006/087310 | 8/2006 |

OTHER PUBLICATIONS

International Search Report in International Application No. PCT/FR2010/000388, mailed Mar. 7, 2011.
Written Opinion issued in International Application No. PCT/FR2010/000388.

* cited by examiner

*Primary Examiner* — Jill Warden
*Assistant Examiner* — Joye L Woodard
(74) *Attorney, Agent, or Firm* — Oliff & Berridge, PLC

(57) ABSTRACT

A method for pyrogasification of organic wastes that employs a vertical furnace filled with metal masses in the shape of metal toroids (2) previously raised to a high temperature (500 to 1100° C.) and organic materials to be pyrolyzed. It also employs a furnace for heating toroids transported by an Archimedes screw driven by a gear motor, as well as a separator for recovering the mineral residues, whereby separation between the toroids and residues is effected with the aid of a screen and an Archimedes screw driven by a gear motor.

11 Claims, 1 Drawing Sheet

METHOD FOR PYROGASIFICATION OF ORGANIC WASTE

Figure 1:
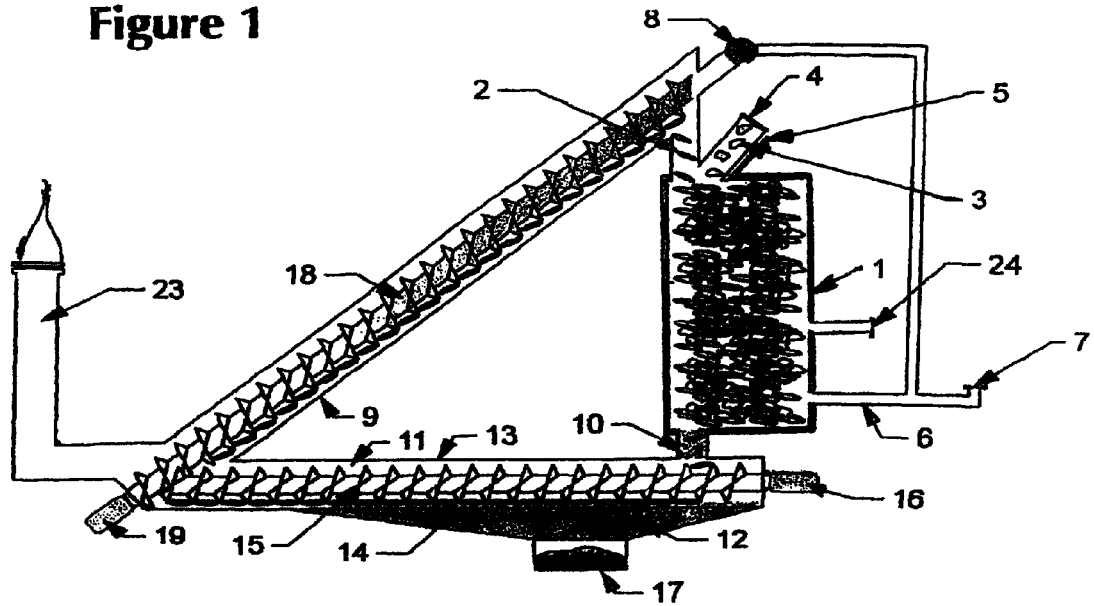

The invention relates to a novel method for pyrogasification of organic wastes.

Pyrogasification is a method for treatment of and energy recovery from organic materials.

In this specification, "organic materials" and "organic waste" are understood to mean the materials contained in the waste, as well as agricultural and biomass products and coproducts.

Energy recovery from waste and biomass is of major interest today in that it contributes to effectively combating the greenhouse effect and the future shortage of fossil fuels.

The method according to the invention uses pyrogasification of organic materials.

There are several paths to energy recovery from organic materials:

incineration, a well-known and widely-used method, which is coming under criticism today because of its installation costs and, in particular, its high offgas treatment costs (dioxins, furans, heavy metals, etc.);

methanization, which is not strictly speaking a concurrent method with pyrogasification because it is used only for wet products.

Pyrolysis consists of breaking down the organic material by heat (500 to 1100° C.), protected from organic and hence air. Its breakdown products are noncondensable gases (CO, $H_2$, $CO_2$), noncondensable hydrocarbons ($CH_4$, $C_2H_6$, $C_3H_8$, $C_4H_{10}$), heavy hydrocarbons, tars condensable in oils, water ($H_2O$), and coke (carbon). The proportions of these components depend on the pyrolysis reaction conditions.

If the reaction is conducted at a low temperature (400 to 500° C.) and with a long residence time (several tens of minutes), coke will be the majority product of this organic material breakdown.

If the reaction is conducted at a high temperature (700 to 1000° C.) with a rapid temperature rise and short residence time (a few seconds or a few minutes), the majority product will be a combustible gas.

In both these reactions, the gas produced is, as stated above, composed of noncondensable gases (CO, $H_2$, $CO_2$) and noncondensable hydrocarbons ($CH_4$, $C_2H_6$, $C_3H_8$, $C_4H_{10}$), the other compounds produced by these reactions being heavy hydrocarbons, tars condensable in oils, and water ($H_2O$) in condensable vapor form.

Elimination of these tars to form a synthesis gas ($CO+H_2$) with a tar content of less than 0.1 mg/m$^3$ (so that this gas can be recovered in a lean burn gas generator) is the basic issue as electricity production is one of the main methods of energy recovery from biomass and organic waste. Recovery by a heat-engine generator at least doubles electricity production by comparison with generators driven by steam turbines using the organic Rankine cycle (ORC).

Current processes produce a gas that can be used for energy recovery only by burners, thus calling on steam or ORC processes.

The principal current methods for achieving pyrolysis are:

according to a first method, the material is heated in a sealed envelope (furnace) by means of a double envelope in which the combustion gases from a burner circulate. Because of its poor heat exchange (by walls only), this method requires large surfaces and a large volume. It is useful for slow reactions conducted at low temperatures (400 to 500° C.). The drawback of this method is that the temperature and mixing of the materials are not under good control and production cannot be switched to gas or oil production according to user choice or demand. Only gas recovery by burner can be considered. The large quantity of coke, which for certain pyrolyzed materials is a waste, is also a drawback of this method;

according to another method, direct heating of the materials to be pyrolyzed by hot gases released by a flame is used. With this method, heat transfer is better but the combustion in the same enclosure as the pyrolysis reaction requires a large oxygen supply (excess combustion air) which harms the quality of the waste gases (possibility of chlorine-containing products) and also harms energy production.

Other methods exist for transferring energy to the material to be pyrolyzed, using heating tubes, fluidized beds, and spraying of materials onto high-temperature reactors. These methods are either not robust or they present engineering problems in industrial production.

One method in this category that will be highlighted is a method using steel beads heated outside the furnace and then passed through an airlock system into the furnace where they are mixed with the material to be pyrolyzed in a horizontal or slightly sloping furnace. Such a method is described in international patent applications WO 2005/018841 and WO 2006087310; this method is efficient because it fully controls the residence time by controlling the furnace rotational speed, and controls the temperature by controlling the bead temperature. On the other hand, the fact that the system uses a horizontal furnace and the bead-material mixture is driven by an Archimedes screw or by a rotating furnace means that only about one-third of the furnace, in the lengthwise direction, can be filled with said mixture. Because the pyrolysis gas is produced as soon as the beads contact the materials when they are introduced, this method does not crack the condensable gases and tars sufficiently because, from the time they are produced to the time they are extracted, these gases are no longer in contact with the bed of hot beads and residual materials. This small contact surface makes cracking poor and incomplete. Another drawback of this method is that, when in the form of clusters, the beads tend to clump together, particularly at high temperatures, and then become difficult to handle and transport. This applies particularly to the second patent (WO 200608710) where the beads referenced 40 in the cones or funnels do not circulate or circulate only with great difficulty.

In view of all these difficulties, the present invention overcomes the problems by using high-temperature stainless steel toroids.

Preferably, these toroids are made of an alloy containing nickel and cobalt in order to favor catalysis at the moment of cracking.

Figure 2:
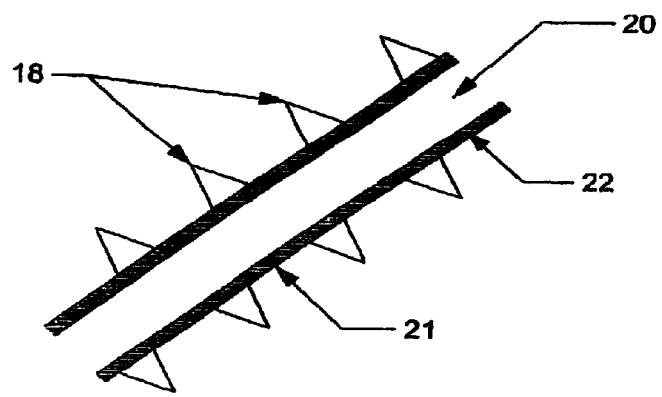

This invention will be better understood by reading the description referring to the drawings, wherein:

FIG. 1 shows schematically the device implementing the pyrogasification method according to the invention, and FIG. 2 shows a detail of one embodiment of said device.

These toroids travel in the same direction as the materials to be pyrolyzed in a static vertical furnace.

The choice of toroids instead of beads is essential in this invention: the toroids have the highest ratio between heat exchange surface area and weight, which is important as it affords the best possible yield both when the toroids are heated in the heating furnace and when this energy is recovered and transferred to the materials to be pyrolyzed. For example, a classical refractory steel bead, namely a spherical shape with a diameter of 40 mm, weighs 261.4 grams and has an exchange surface of 5026.55 mm$^2$. For a weight substantially equal to 262 grams, it will be possible to use a toroid with an outside diameter of 60 mm and an inside diameter of 24 mm, giving it a cross section of 18 mm. The exchange surface of this toroid will be 7461.42 mm². The exchange surface area ratio between toroids and spheres for an equivalent weight of steel will thus be about 1.5. The rates of heating and heat transfer will thus be improved over existing methods.

Other dimensions for toroids (2) are possible, but it appears that the best results are obtained for an inside diameter of 15 to 100 mm and an outside diameter of 50 to 150 mm.

Furthermore, the use of toroids rather than beads has an important advantage regarding circulation of the coolant (namely the metal masses bringing heat to the materials to be pyrolyzed). Contrary to beads, which tend to clump as stated above, making it difficult for them to circulate, toroids do not block each other and their circulation is greatly facilitated, still further improving the efficiency of the method according to the invention.

The present invention enables all products containing organic material to be treated, whether they come from biomass and are thus considered to be renewable energy or do not come from biomass.

The following products may be cited as non-limiting examples of biomass products:
  wood, wood chips, and sawdust,
  straw,
  wine-growing waste,
  agricultural coproducts and waste (liquid and solid manure, molasses, bone meal),
  bagasse,
  biofuels (miscanthus, etc.),
  water purification sludge,
  paper-making liquors,
  paper, cardboard, cellulose,
  household waste,
  solid industrial waste.

In the case of products not derived from biomass, the following non-limiting product examples may be cited:
  coal and charcoal waste
  oil industry waste,
  polluted wood waste,
  organic chemistry waste,
  paint waste,
  plastic waste (polyethylene, polystyrene, polyurethane, PVC),
  used tires.

This list is not exhaustive, as any material containing organic material can be treated by the method according to the invention, whether for heat recovery, for destruction, or for pollution cleanup.

The materials treated by the method according to the invention can be in the solid, paste, or liquid form. Solid products must be pre-ground down to elements measuring approximately 50 mm.

The products treated by the method according to the invention may contain a large quantity (30 to 100%) of organic material and, in this case, the reaction is either energy-autonomous for waste destruction or energy-surplus, producing electricity and energy in the form of steam or hot water. The treated products can also be contaminated materials containing little organic material. In this case, the method can be used to clean up contaminated land for example, using another energy to activate the pyrolysis reaction (biogas from burial sites or water treatment stations or methanization gas from fossil energy).

The method according to the invention can achieve pyrolysis and gasification of organic materials in quantities between 50 and 10,000 tons per year. For higher amounts, it is desirable to operate several units in parallel.

Reference will now be made to FIG. 1 which shows a furnace (1) which is a small-volume vertical enclosure (1.5 m³ for treating one ton/hour, with a height of approximately 2.5 m) in which pyrolysis takes place. Contrary to existing devices, this furnace where pyrogasification takes place is full of the mixture of high-temperature toroids (2) (500 to 1100° C. as needed) and the organic materials (3) to be pyrolyzed; the proportion between the toroids (2) and the materials to be pyrolyzed (3) will be determined in such a way as to produce the best pyrogasification reaction. The organic materials (3) are introduced either through an airlock (4) when they are solid, as is the case in FIG. 1, or through an airlock (5) when they are liquid. A device for stirring the toroids (2) and the organic materials (3), not shown here, is provided inside furnace (1) allowing thorough mixing of said toroids (2) and said organic materials (3), thus improving pyrolysis of the latter. The reaction is very rapid and the pyrolysis gas including noncondensables as well as condensable hydrocarbons and coke are produced as soon as the materials (3) are introduced into furnace (1). The point of routing the mixture of toroids (2) and organic materials (3) through the top of the furnace (1) at a high temperature is that cracking of the hydrocarbons at a high temperature and gasification of the residual coke occurs along this path due to the intimate contact with the very large exchange surface area of the superheated toroids (2) and organic materials (3). Preferably, in order to improve this reaction still further, high-temperature stainless steel toroids in an alloy including nickel and cobalt are chosen, which has the effect of improving gasification catalytically, whereby such a toroid composition facilitates tar cracking. This reaction can also be improved by adding $CO_2$ or water vapor at some point on the mixing path in order to gasify the residual carbonized particles into CO and $H_2$.

The aforementioned mixing path terminates at the bottom of the furnace (1) where the gases are extracted through an outlet (6) provided with an adjustable suction system, not shown here, which produces a slightly negative pressure in the furnace (1). Locating the outlet (6) at the lower part of furnace (1) is preferred because it enables the materials 3) to be pyrolyzed for the maximum amount of time because they are on a maximum path, thus improving the results of said pyrolysis. These gases are then fed either directly to heat recovery (burner and boiler, not shown here), or cooled and scrubbed for optimal energy recovery in an electric generator (7).

A burner (8) is provided to reheat the toroids (2) inside a reheating furnace (9) which will be explained further on in the description, it being understood that some of these combustion gases, ranging from 10% to 100% (in the case that a material to be pyrolyzed that has a low percentage of organic products is being destroyed) are directed to the furnace (9) that reheats the toroids (2), with the highest temperature being in the upper part of this furnace (9), thus allowing toroids (2) to be introduced into furnace (1) at a maximum temperature.

The toroids (2) as well as the solid pyrolyzed particles are recovered under the furnace by a flow control system (1) that allows the rate at which the mixture of toroids (2) and organic materials (3) circulate in furnace (1) to be adjusted. This mixture is then introduced into a separator (11) that separates the toroids (2) from the pyrolyzed residues, namely the minerals (12) formed from said solid pyrolyzed particles; this separator (11) is comprised of a cylinder (13) with a bottom screen (14) and, if it receives products at a high temperature (between 400 and 700° C.), is made of refractory steel. In this cylinder (13), the mixture of toroids (2) and minerals (12), the latter of which may include metals, is pushed by an Archimedes screw (15) driven by a gear motor (16); as said mixture advances, the mineral particles (12), which are far smaller in size than the toroids (2), are extracted through the screen (14), which is preferably disposed over most of the screw (15), and recovered in a receptacle (17) designed to evacuate said particles and provided with an airlock to prevent air from entering the device according to the invention upon this evacuation. The particles are thus evacuated in order to serve for energy recovery or to be treated depending on whether or not the pyrogasified product is classified as "waste."

At the end of the path in this separator (11), the toroids (2) and minerals (12) are totally separated and only the toroids (2) are fed to the reheating furnace (9). The function of this furnace (9) is to heat the toroids (2) to the necessary temperature determined for effecting the pyrolysis reaction in the pyrogasification furnace (1), possibly in a continuous cycle. It also serves to raise the toroids (2) to bring them from the separator (11) to a higher level at the top of the pyrogasification furnace (1). The toroids (2) are moved to the heating furnace (9) by an Archimedes screw (18), as in the separator (11). The screw (18) is made to rotate by a gear motor (19) that drives a shaft, the assembly being sloped according to the degree of lift to be effected between the separator (11) and the furnace (1). The toroids (2) are heated directly by contact with the burner (8) combustion gases, which, in order not to introduce oxygen which is present in small amounts in the combustion gases, requires adjusting the extractors and fume flows, not shown here, in order to create a neutral pressure point between the reheating furnace (9) and the pyrogasification furnace (1). This reheating furnace (9), which must withstand temperatures as high as 1100° C., is made of high-temperature refractory steel. As well as these temperatures, expansion of the metals is very significant and the design of this furnace is the subject of a preferred embodiment which is better seen in FIG. 2.

In the embodiment illustrated in this FIG. 2, the spirals of the screw (18) are not directly attached to the shaft (20) that drives them rotationally, but to a sleeve (21) surrounding the shaft (20); according to the embodiment illustrated in FIG. 2, this sleeve is hollow and filled with an insulator (22), but according to another embodiment the sleeve is itself made of a heat-insulating material. Whatever the embodiment, the presence of the sleeve (21) considerably limits the transmission of heat to shaft (20) so that said shaft (20) retains its original mechanical characteristics. The shaft (20) thus protected can be safely cooled at the level of bearings, not shown here.

The high-temperature (1000° C.) combustion gases are evacuated once they have been checked for conformity to discharge regulations and after cooling in a classical exchanger in order to recover the energy they contain (for example to dry the products to be pyrolyzed).

In an embodiment not illustrated here, it is also possible to provide recovery of the high-temperature (1000° C.) combustion gasses, said gases being fed into the double envelope with which the pyrogasification furnace (1) is then provided in order to recover the maximum energy for cracking hydrocarbons and tars in the case of thermal or electrical recovery, after which these gasses are evacuated as indicated above once they have been checked for conformity to discharge regulations and cooled in a classical exchanger.

The toroids (2) heated to the required temperature are introduced at the flowrate necessary according to the quantity and quality of the material to be pyrogasified in the furnace (1). The organic materials to be treated are introduced at a rate regulated by an airlock system in order not to introduce oxygen.

In the general design of the device according to the invention, FIG. 1 illustrates a preferred embodiment, reducing size and allowing optimal implementation of the method according to the invention; thus, the three essential elements of said device, namely the pyrogasification furnace (1), the separation system (11), and the reheating furnace (9) are disposed in a right-angle triangle where the furnace (9) occupies the position of the hypotenuse and the other two sides correspond to furnace (1), preferably vertical, and system (11), substantially horizontal. In one variant, system (11) can be slightly inclined in which case the right angle of the triangle described above would be slightly obtuse.

The invention claimed is:

1. A method for pyrogasification of organic wastes, the method comprising:
    (a) introducing the organic wastes, and introducing metal masses raised to a high temperature, into a pyrolysis furnace having an inlet for said wastes and for said metal masses as well as an outlet for pyrolysis gases and for pyrolyzed residue and the metal masses,
    (b) subjecting the wastes to pyrolysis in the pyrolysis furnace to generate pyrolyzed residues and pyrolysis gases,
    (c) discharging the pyrolyzed residues and the metal masses, through the outlet for the pyrolyzed residues and the metal masses into a separating system, and separating the pyrolyzed residues and said metal masses in the separating system, and
    (d) reheating said separated metal masses in a reheating furnace for reuse in step (a),
    wherein said metal masses are composed of toroids made of stainless steel.

2. The method according to claim 1, wherein said toroids contain nickel and cobalt.

3. The method according to claim 1, wherein said toroids have an inside diameter of between 15 and 100 mm and an outside diameter of between 50 and 150 mm.

4. The method according to claim 1, wherein the pyrolysis gas outlet is provided at a lower part of the pyrolysis furnace from where said pyrolysis is effected.

5. The method according to claim 4, wherein the generated pyrolysis gases are extracted through the outlet for the pyrolysis gases by a system that produces a slightly negative pressure inside said pyrolysis furnace.

6. The method according to claim 1, wherein the discharging includes regulating a discharge rate of the metal masses and the pyrolysis residues from the pyrolysis furnace.

7. The method according to claim 1, wherein the separating includes:
    passing the pyrolyzed residues and the metal masses in the separating system over a screen, the pyrolyzed residue passing through the screen and being collected in a receptacle, and the metal masses not passing through the screen and being transported through the separating system to a bottom of a reheating furnace.

8. The method according to claim 1, wherein the reheating furnace comprises a burner and an Archimedes screw, wherein the screw and the burner reheat the metal masses and bring the reheated metal masses to the introduction point, located at an upper level at a top of the pyrolysis furnace.

9. The method according to claim 8 wherein spirals of said screw are separated from a shaft driving said screw by a sleeve that insulates said shaft from spirals of said screw.

10. The method according to claim 1, wherein said pyrolysis furnace, said separating system, and said reheating furnace respectively form the sides of a right angle of a right-angled triangle and its hypotenuse, said pyrolysis furnace being vertical.

11. The method according to claim 1, wherein said separating system comprises an Archimedes screw for transporting the metal masses to the reheating furnace.

* * * * *